United States Patent [19]
Chen

[11] Patent Number: 6,008,718
[45] Date of Patent: Dec. 28, 1999

[54] SINGLE-RESISTOR-FOIL PRESSURE SENSITIVE COORDINATE INPUT SYSTEM

[76] Inventor: Ming-de Chen, Rm. 5. 8th Flr..118 Chuangching Rd., Tainan, Taiwan

[21] Appl. No.: 08/976,036

[22] Filed: Nov. 21, 1997

[51] Int. Cl.$^6$ .................................................. H01C 10/10
[52] U.S. Cl. ........................................... 338/99; 178/18.05
[58] Field of Search .......................... 178/98–150, 18.05; 338/123, 195, 160; 345/174, 173

[56] References Cited

U.S. PATENT DOCUMENTS

| | | | |
|---|---|---|---|
| 5,451,724 | 9/1995 | Nakazawa et al. | 178/20 |
| 5,668,576 | 9/1997 | Ikura et al. | 345/173 |

Primary Examiner—Teresa Walberg
Assistant Examiner—Jeffrey Pwu
Attorney, Agent, or Firm—Connolly Bove Lodge & Hutz LLP

[57] ABSTRACT

The present invention relates to a single-resistor-foil pressure sensitive coordinate input system, which comprises: a resistor foil surrounded by a frame, and a base with a copper plate covered by the resistor foil and an control circuit. The frame has four corners, which each have an electrode. The base has four corners, which respectively contact the electrodes of the four corners of the resistor foil and connect to the control circuit. The control circuit has transistors as electronic switches, and the copper plate has a terminal, which is connected to the electronic switches. When the resistor foil contacts the base and a voltage is applied on the resistor foil, by switching the electronic switches, a coordinate measurement is performed.

1 Claim, 4 Drawing Sheets

SINGLE-RESISTOR-FOIL PRESSURE SENSITIVE COORDINATE INPUT SYSTEM

BACKGROUND OF THE INVENTION

1. Field of the Invention

The present invention relates to a single-resistor-foil pressure sensitive coordinate input system, particularly to a pressure sensitive coordinate input system with a single foil of resistant material and a transistor circuit.

2. Description of Related Art

Conventional resistor pressure sensitive input systems, as shown in FIG. 1, comprise an upper resistor foil X, a lower resistor foil Y and a control circuit. A pair of electrodes X+, X− are connected to the upper resistor foil X on the X-axis. A pair of electrodes Y+, Y− are connected to the lower resistor foil Y on the Y-axis. A certain voltage is applied to the electrodes of both foils. When the surfaces of the foils are pressed on, on an edge without electrodes the voltage is measured, from which the coordinates of the pressure point is derivable.

The control circuit has four terminals X+, X−, Y−, Y− for controlling the conducting behavior of the transistors Q1–Q4. The electrodes X+ and X− on the upper resistor foil X are connected to the transistors Q1 and Q2, respectively. The electrodes Y+ and Y− on the lower resistor foil Y are connected to the transistors Q3 and Q4, respectively. The electrodes X+ and Y+ are via the transistors Q1, Q3 respectively connected to a voltage Vcc. To perform a coordinate measurement on the area of the resistor foils a pressure point on the foils is pressed on. For measuring the X coordinate, the transistor Q1 opens, and a positive voltage is fed to the electrode X+. The transistor Q2 opens, too, and the electrode X− is grounded. The transistors Q3, Q4, connected to the electrodes Y+, Y− of the lower resistor foil Y, block, and no current flows through the lower resistor foil Y. By pressing on the foils, the upper and lower resistor foils X, Y are connected, and from the resulting voltage at AD-X the X coordinate of the pressure point is derived.

For measuring the Y coordinate, the transistor Q3 opens, and a positive voltage is fed to the electrode Y+. The transistor Q4 opens, too, and the electrode Y− is grounded. The transistors Q1, Q2, connected to the electrodes X+, X− of the upper resistor foil X, block, and no current flows through the upper resistor foil X. By pressing on the foils, the upper and lower resistor foils X, Y are connected, and from the resulting voltage at AD-Y the Y coordinate of the pressure point is derived.

Since in this arrangement the voltage Vcc is permanently switched, the voltages VX at the electrode X− and VY at the electrode Y− are not stable. Furthermore, the voltages VX and VY are transmitted via the upper and lower resistor foils X, Y, with a linear dependence on the distance of the pressure point PX, PY to the electrode X−, Y−, and the supply voltage Vcc is permanently switched between the upper and lower resistor foils, therefore both resistor foils have to be made of the same, uniform material, which is difficult to achieve. Noise and unstable voltage easily occur.

SUMMARY OF THE INVENTION

The object of the present invention is to provide a pressure sensitive coordinate input system which has a single resistor foil with four electrodes on the corners thereof, the electrodes being connected to a control circuit, and a terminal on the base of the resistor foil for measuring the voltage, when the resistor foil has been pressed on, such that noise and unstable voltage are avoided.

The present invention can be more fully understood by reference to the following description and accompanying drawings.

DETAILED DESCRIPTION OF THE PREFERRED EMBODIMENT

Figure 1:
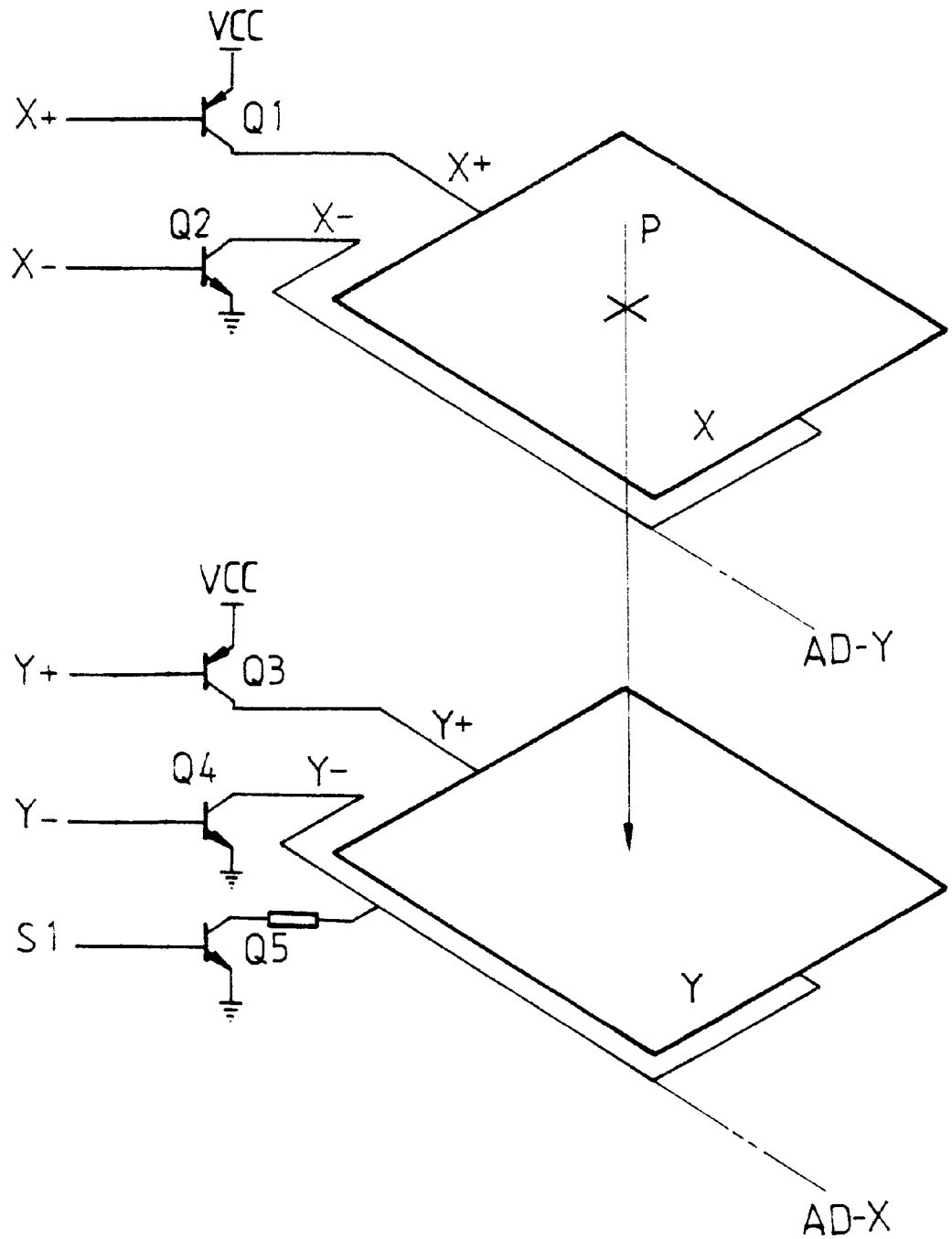
FIG. 1 is a schematic illustration of a conventional coordinate input system.
Figure 2:
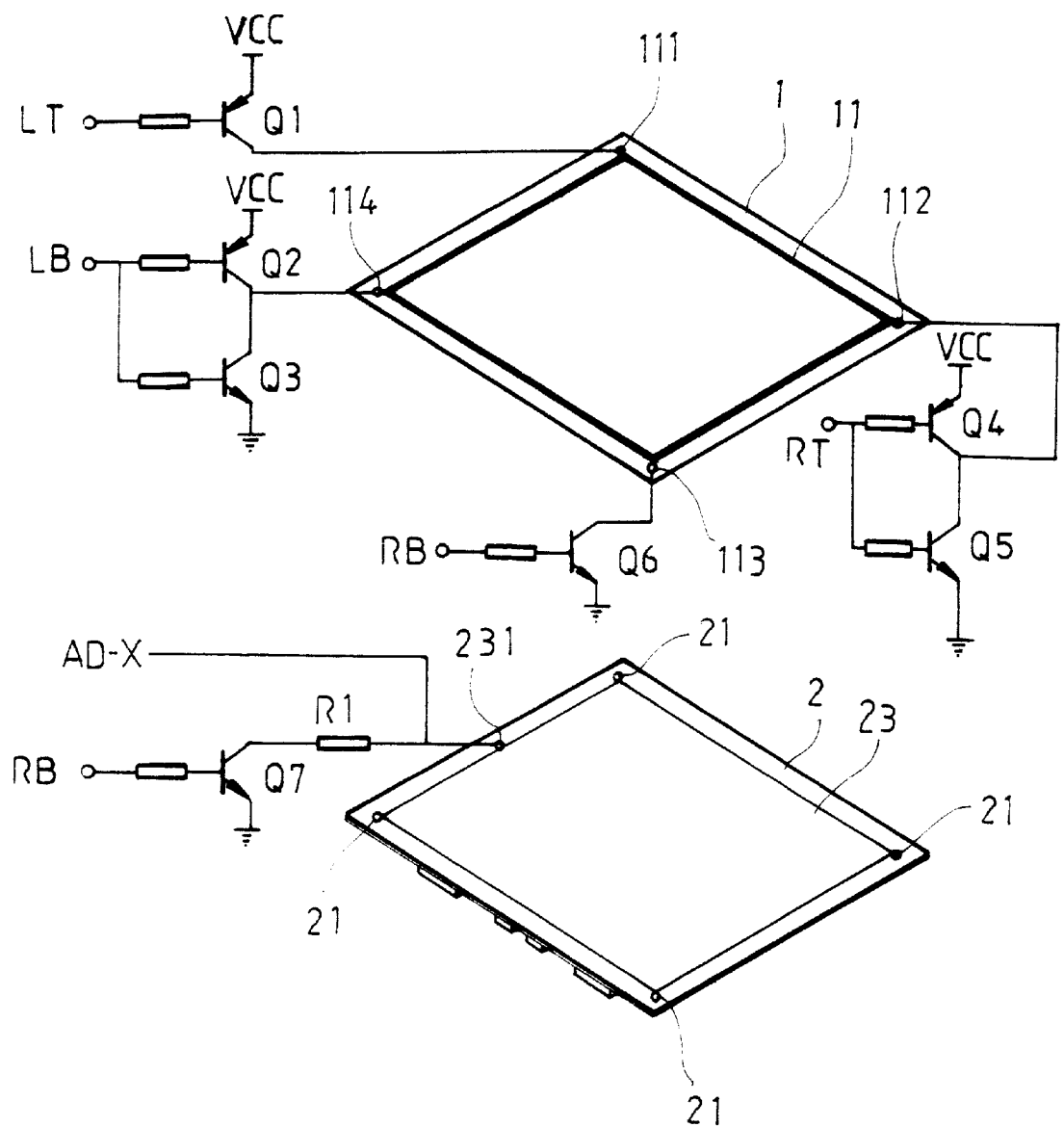
FIG. 2 is a schematic illustration of the present invention.

As shown in FIG. 2, the pressure sensitive coordinate input system of the present invention mainly comprises a resistor foil 1 and a base 2, having a face, on which the resistor foil is laid, and a backside. A frame 11 with four corners, an upper left, an upper right, a lower right and a lower left corner, surrounds the resistor foil 1. The upper left, upper right, lower right and lower left corners of the frame 11 have electrodes 111, 112, 113, 114, which are respectively connected to contact points 21 on the face of the base 2. The contact points 21 lead to a control circuit 22 on the backside of the base 2 for connecting transistors Q1–Q6 to a supply voltage Vcc and 0V. Transistors Q1–Q6 are also connected to I/O terminals LT, LB, RT and RB. On the face of the base 2 a copper plate 23 is mounted, the area of which is equal to the area of the resistor plate 1 and which has a test terminal 231 on one edge, connecting to a transistor Q7 for test input or stand-by operation.

The control circuit 22 is connected to the contact points 21 on the four corners of the face of the base 2. The contact points 21 in turn are connected to the electrodes 111, 112, 113, 114 on the frame 11, which thus serve as terminals of the supply voltage. Thereby the distance between the frame 11 and the control circuit 22 is reduced to a minimum, and the voltage provided will not be different from the supply voltage, ensuring proper measurements.

The I/O terminals LT, LB, RT and RB control the conducting behavior of transistors Q1–Q6, i.e., whether the voltage supply is passed on to the electrodes 111, 112, 113, 114 or interrupted. An A/D converter on the control circuit is directly connected to terminal AD-X. The conducting state of transistors Q1–Q6, depending on the I/O terminals, is as follows:

| LT | Q1 | output | | LB | Q2 | Q3 | output |
|---|---|---|---|---|---|---|---|
| 0 | ON | Vcc | | 0 | ON | OFF | Vcc |
| 1 | OFF | Vcc | | 1 | OFF | ON | 0 V |
| RT | Q4 | Q5 | output | RB | Q6 | | output |
| 0 | ON | OFF | Vcc | 0 | ON | | 0 V |
| 1 | ON | ON | 0 V | 1 | OFF | | 0 V |

Figure 3:
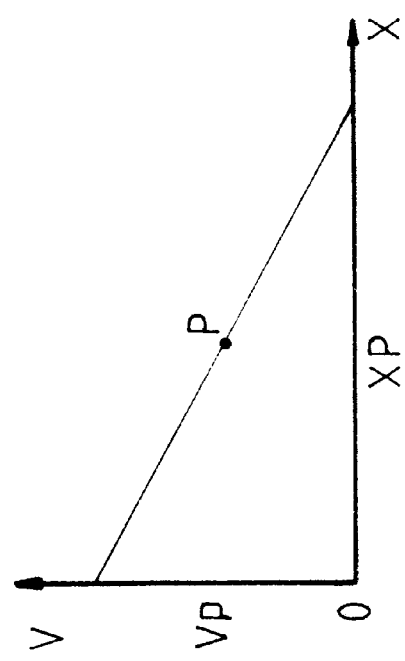
FIG. 3 is a schematic illustration of the linear response of the present invention.

For measuring the X coordinate of a pressure point on the resistor foil 1, transistor Q1 connects Vcc to the electrode 111, and the resistance of the frame 11 is low, the left edge of the frame 11 is on the supply voltage Vcc. Transistor Q6 connects 0 V to the electrode 113, the right edge of the frame 11 is grounded at 0 V. The voltage of a test point varies linearly with the distance from the left and right edges (as shown in FIG. 3). When pressing on the pressure point on the resistor foil 1, the resistor foil 1 is brought into contact with the copper plate 23. Since transistor Q7 is non-conductive, the pressure point is connected directly with the A/D converter. The A/D converter gives out the X coordinate of the pressure point.

For deriving the Y coordinate of the pressure point, the upper and lower edges of the frame 11 are in the same way exposed to the supply voltage Vcc and to 0 V. This is done by switching LB and hence the conducting state of transistors Q2, Q3, thus altering the voltage at the electrode 114 in the lower left corner of the frame 11 from Vcc to 0 V, further by switching RT and hence the conducting state of transistors Q4, Q5, thus altering the voltage at the electrode 112 in the upper right corner of the frame 11 from 0 V to Vcc. The voltage of a test point now varies linearly with the distance from the upper and lower edges. When pressing on a pressure point on the resistor foil 1, the resistor foil 1 is brought into contact with the copper plate 23. Since transistor Q7 is non-conductive, the pressure point is connected directly with the A/D converter. The A/D converter gives out the Y coordinate of the pressure point.

Figure 4:
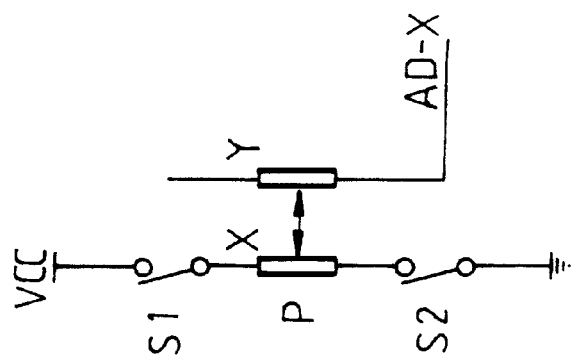
FIG. 4 is a schematic illustration of the effective circuit of the present invention.

Referring to FIG. 4, since the upper left corner of the frame 11 is always maintained at Vcc via transistor Q1 and the lower right corner at 0 V via transistor Q6, one edge of the frame 11 has vcc, and the opposite edge is grounded. An effective circuit as shown in FIG. 4 results. For switching between measuring the X coordinate and the Y coordinate of the pressure point, only the voltages of the electrode 112 on the upper right corner and of the electrode 114 on the lower left corner of the frame 11 have to be altered.

Referring again to FIG. 2, for stand-by operation, transistor Q2 is conductive, and transistor Q3 is non-conductive, such that Vcc is applied at the electrode 114. Furthermore, transistor Q4 is conductive, and transistor Q5 is non-conductive, such that Vcc is applied at the electrode 112, too. The resistor foil 1 has a positive voltage, and the copper plate 23 as well as terminal AD-X are via transistor Q7 and resistor R7 grounded. When the resistor foil 1 is pressed on at the pressure point, a resistance R is passed through (resistor foil 1) on the way to AD-X. The voltage at the A/D converter amounts to:

Vcc=+5 V

R1=10K

R=50K

VY=V+XR/(R1+R)

Therefore, VY is a relatively high voltage, like Vcc. If AD-X has a voltage above a threshold (like 2.5 V), pressing the resistor plate 1 is clearly recognized, otherwise not. Thus fake measurements when only slightly touching the resistor plate 1 are avoided.

Figure 5:
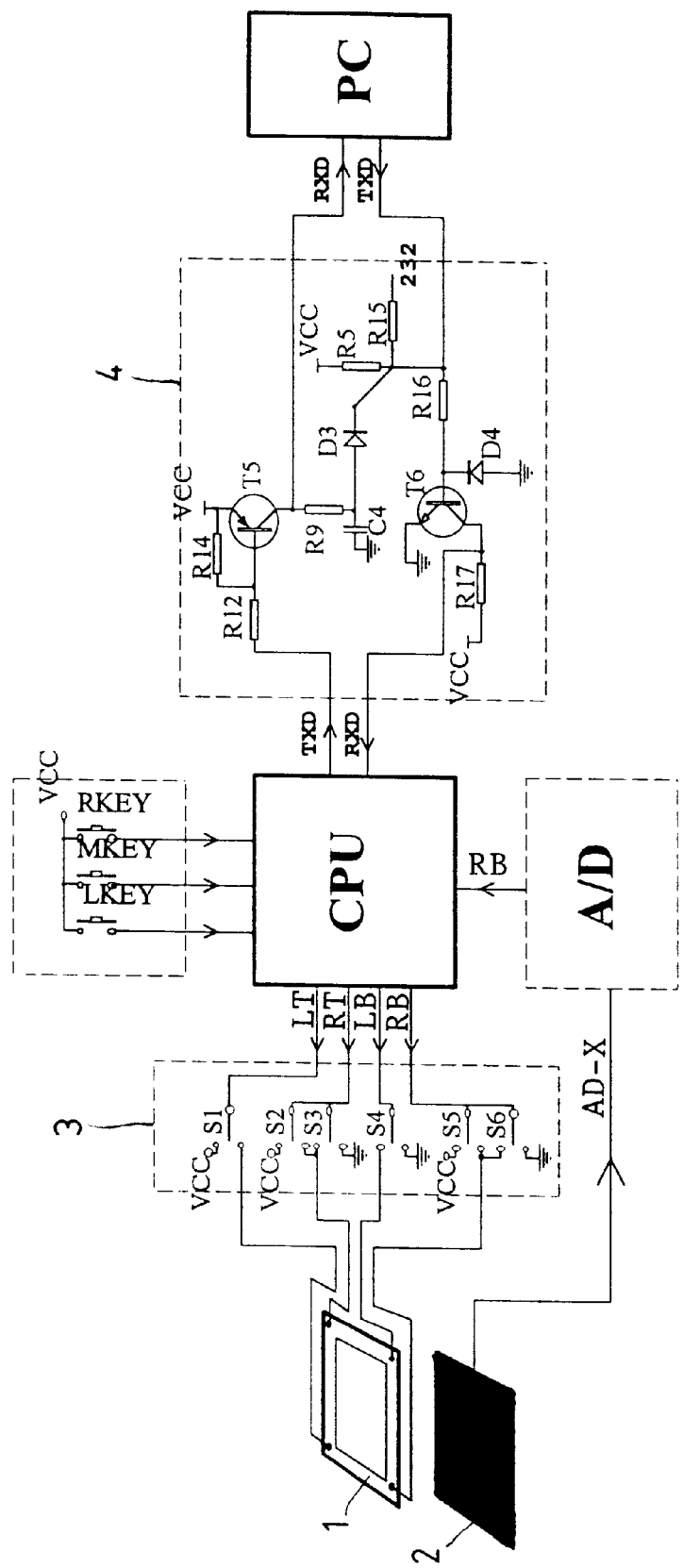
FIG. 5 is a schematic drawing of the control circuit for use in this invention.

As shown in FIG. 5, the control circuit comprises a CPU (Central Processing Unit), a interface circuit 4, and a transfer circuit 3. The CPU and the interface circuit 3 are conventional. The transfer circuit 3 in the control circuit comprises six switches S1, S2, S3, S4, S5 and S6 which further comprise six transistors Q1, Q2, Q3, Q4, Q5 and Q6 shown in FIG. 2 such that the I/O terminals LT, LB, RT, and RB can control the conducting behavior of the transistors Q1–Q6 respectively.

In another embodiment of the present invention, an elastic foil is substituted for the copper plate 23. The elastic foil is glued to the resistor foil 1, thus being directly connected to the resistor foil 1 with the same effect for the input of coordinates.

I claim:

1. A single-resistor-foil pressure sensitive coordinate input system, comprising a base, having a face and a backside, and being provided with four contact points on the face;

a copper plate, having four corners, and being mounted on the face of said base;

a resistor foil, being laid on said base; and a control circuit, being located at the backside of said base, and having six switches composed of transistors respectively; characterized in that said resistor foil is surrounded by a frame with four corners: an upper left corner, an upper right corner, a lower left corner, and a lower right corner; each of said four corners is provided with an electrode respectively; each of said four contact points is located at each of the four corners of said copper plate respectively so as to oppositely connect with the respective electrode on said frame; said copper plate has a test terminal at an edge thereof; and said control circuit connects said four contact points and said test terminal.

* * * * *